United States Patent [19]

Patel et al.

[11] 4,439,346

[45] Mar. 27, 1984

[54] POLYDIACETYLENE GELS

[75] Inventors: Gordhanbhai N. Patel, Morris Plains; Dawn M. Ivory, Randolph, both of N.J.

[73] Assignee: Allied Corporation, Morris Township, Morris County, N.J.

[21] Appl. No.: 938,292

[22] Filed: Aug. 30, 1978

[51] Int. Cl.$^3$ .............................................. C09K 3/00
[52] U.S. Cl. .............................. 252/408.1; 252/315.1; 116/202; 116/207; 116/216; 73/356; 526/285
[58] Field of Search ................ 252/408, 316; 116/200, 116/202, 206, 207, 216; 73/356; 526/285; 23/253 TP

[56] References Cited

U.S. PATENT DOCUMENTS 3,344,630 10/1967 Olsen et al. .................... 23/253 TP
3,999,987 4/1979 Patel ................................. 252/408
4,215,208 7/1980 Yee et al. ....................... 252/408 X Primary Examiner—J. L. Barr
Attorney, Agent, or Firm—Alan M. Doernberg; Gerhard H. Fuchs; Kenneth E. Stroup, Jr.

[57] ABSTRACT

Polydiacetylene gel compositions, comprised of a polydiacetylene and a gel-forming liquid therefor, are described which undergo a change in color and in physical state to a solution when heated to a predetermined temperature. The gel compositions exhibit hysteresis temperature characteristics which allow the original color change to be maintained and recorded until the solution is cooled below the predetermined temperature. Thus, the gel compositions are useful in temperature-indicating devices for reversibly monitoring a wide range of temperatures. A novel class of polydiacetylene compounds is also described, useful in forming the gel compositions, formed from monomeric diacetylenediol bis(alkoxycarbonylmethylurethanes).

12 Claims, 1 Drawing Figure

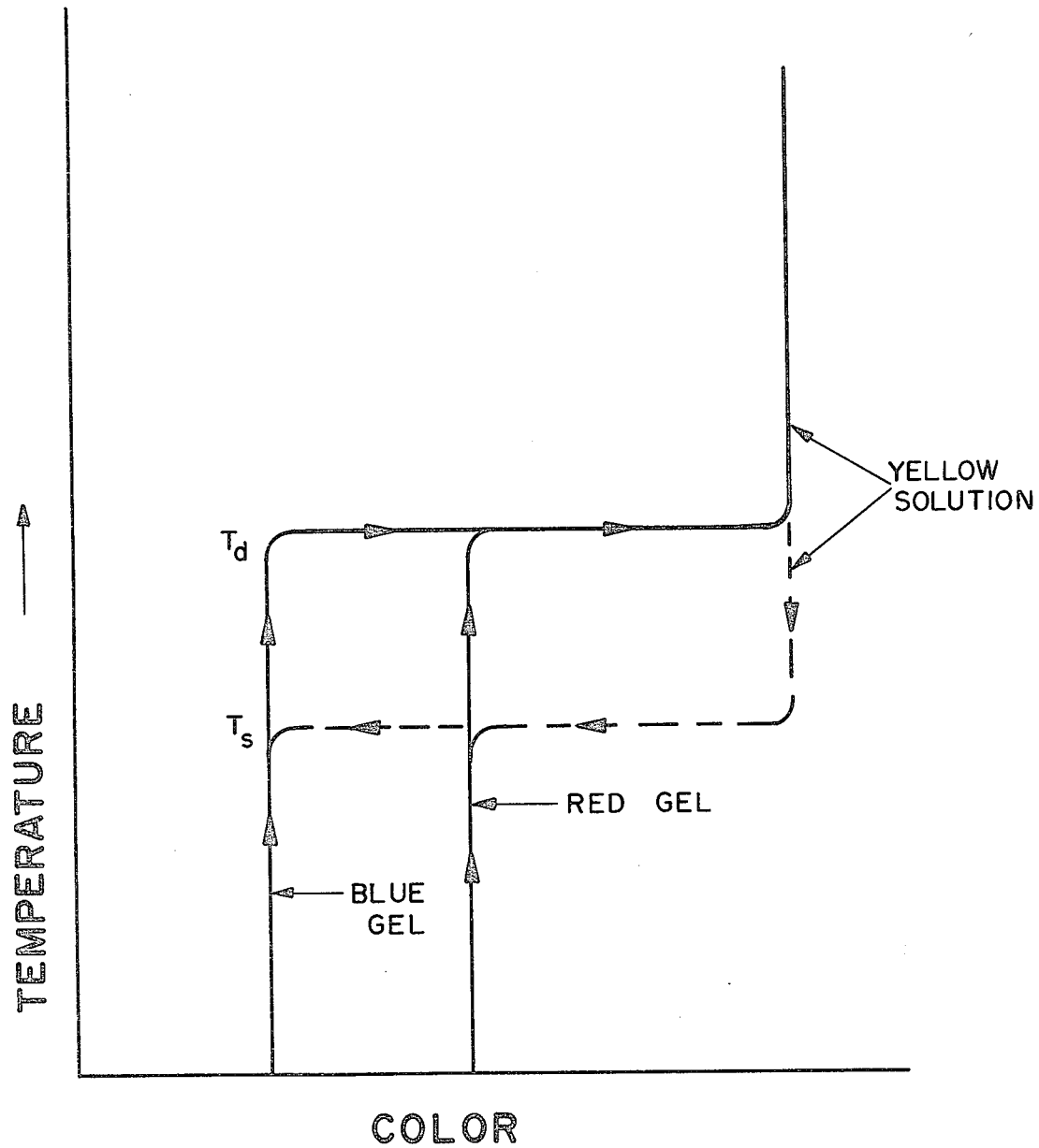

POLYDIACETYLENE GELS

BACKGROUND OF THE INVENTION

1. Field of the Invention

This invention relates to novel polymeric gel compositions, useful in temperature-indicating devices, containing a polydiacetylene and a gel-forming liquid therefor, and also to a novel class of polydiacetylenes, useful in forming the gel compositions, formed from monomeric diacetylene diol-bis(alkoxycarbonylmethylurethanes).

2. Brief Description of the Prior Art

Two types of clinical thermometers currently on the market utilize organic compounds as temperature indicating materials in which a color change occurs at a predetermined temperature. Both types of devices are based on particular phase changes of organic compounds, or mixtures thereof, as the principle underlying the color change.

The first type of device (developed by Bio-Medical Sciences Inc., Fairfield, N.J.) uses the principle of the melting of organic compounds, in which the melt carries a co-mingled dyestuff through a white or colorless absorbing material, so as to produce a visual color change. However, the device in general is not reusable and also requires a protective film between the melting compositions and the dyestuff, and in some cases storage at low temperatures prior to use; factors which tend to increase the overall manufacturing cost. Various modifications of the device are described in the following patents assigned to Bio-Medical Sciences Inc.: U.S. Pat. Nos. 3,981,683 (1976); 3,665,770 (1972); 3,677,088 (1972); 3,704,985 (1972); 3,966,414 (1976); and 3,980,581 (1976).

A further device is described in U.S. Pat. No. 4,042,336 (1977), assigned to Bio-Medical Sciences, Inc., in which the temperature history of a product is visually displayed as a color front on an indicator, initiated by a generated gas, the distance of the front advancement being a function of the temperature-time integral.

The second type of device (marketed by Clinitemp, Inc., Indianapolis, Ind.) uses color changes produced by liquid crystal transitions, as viewed through either a polarizing or a colored film. These liquid crystal devices are reversible and thus reusable but have no hysteresis associated with the color change. As a result, there is little time to record the temperature once the device is detached from the skin or removed, for example, from the mouth.

U.S. Pat. No. 3,479,877 (1968) discloses a temperature indicator device wherein an indicator substance melts, at a predetermined temperature to be monitored, and flows along a wick, the distance of flow corresponding to the length of exposure time at that particular temperature. However, although the indicator records a time-temperature history, it is not reusable in subsequent applications.

U.S. Pat. No. 3,465,590 (1969) discloses a thermometer device which utilizes solid solutions of fatty acids and a dye to reversibly or irreversibly indicate when a particular temperature has been reached. However, the composition employed in the device does not possess hysteresis behavior thus allowing a predetermined temperature to be observed and recorded. Most importantly, the original temperature-indicating composition cannot be regenerated and is thus not reusable in subsequent applications.

SUMMARY OF THE INVENTION

We have unexpectedly found a new class of compositions which are highly suitable as temperature-indicating compositions. The compositions are polymeric gels, comprising a solid polydiacetylene and gel-forming liquid therefor, and exhibit hysteresis temperature behavior. They are capable of reversibly indicating when a predetermined temperature has been reached or exceeded, by undergoing a color change and a change in physical state, together with the attractive advantage of maintaining this color change until recording can be achieved. The original color and physical state of the gel is regenerated by simply cooling the composition generally about 10° C. below the predetermined temperature. Thus, the composition combines the attractive advantages of both irreversible and reversible temperature-indicating compositions into one device.

In accordance with this invention there is provided a composition comprising a polymeric gel consisting essentially of a solid polydiacetylene, or mixture thereof, and a gel-forming liquid therefor, said gel being colored and being capable of undergoing transformation upon heating to the dissolution temperature, thereby forming a solution of said polydiacetylene in said liquid, exhibiting a different color than said gel, said solution being capable of reversibly reforming the gel in its original color and physical state upon cooling to the gelation temperature, being lower than said dissolution temperature.

Further provided is a device for reversibly indicating when a predetermined temperature has been reached or exceeded including a container, a temperature-indicating material positioned inside of said container, capable of reversibly undergoing a color change when a predetermined temperature has been reached or exceeded, and a means for observing said color change; the improvement which comprises providing a polymeric gel of this invention as the temperature-indicating material wherein the color change, formed at the predetermined temperature, persists until a temperature lower than the predetermined temperature is reached thereby restoring the original color and physical state of the gel.

Also provided is a compound of the formula: R—C≡C—C≡C—R', wherein R and R' are independently of the formula: —$(CH_2)_n$—O—CONH—$CH_2$—CO—OA, wherein is an integer value of 1 to 10 and A is $C_1$-$C_{10}$ linear or branched alkyl.

Further provided is a colored composition containing up to 10% by weight of a colored polymer derived from at least one compound as described above.

Also provided is a colored composition containing from 10 to 100% by weight of a colored polymer derived from at least one compound as described above.

BRIEF DESCRIPTION OF THE DRAWINGS

The FIGURE illustrates the hysteresis behavior of typical polydiacetylene gel compositions of this invention.

DESCRIPTION OF THE INVENTION AND THE PREFERRED EMBODIMENTS

The subject "gel" composition comprises a polymeric gel composition consisting essentially of a solid polydiacetylene and a gel-forming liquid therefor. By the term "polymeric gel" as used herein, is meant a colloidal-type of material in which the dispersed phase, i.e. the solid polydiacetylene, has combined with the continuous phase, i.e. the gel-forming liquid, to produce a viscous, jelly-like product. As further described in "The Condensed Chemical Dictionary", by Gessner G. Hawley, Eighth Edition, 1971, by Van Nostrand-Reinhold, p. 412, "a gel is made by cooling a solution, whereupon certain kinds of solutes (gelatin) form submicroscopic crystalline particle groups which retain much solvent in the interstices." The polymeric gels of this invention exhibit properties and appearance which are in accord with the description above and are best described as being analogous to the well known "Jello". The gel compositions of this invention are stable, in the absence of evaporation of the gel-forming liquid, are transparent or translucent, are colored and when heated to a particular temperature, designated herein as the "dissolution temperature", undergo a change in color and physical state. Thus, the gels represent an intermediate physical state between a solid and a liquid.

By the term "gel-forming" is meant that the liquid interacts with the solid polydiacetylene by a variety of attractive forces, e.g., van der Waal's forces, solvent-polymer interactions, solvent cage effects, hydrogen-bonding effects and the like, wherein either the solid polymer or gel-forming liquid are not present as separate entities but are combined into one identifiable and describable mass. The exact physical nature and structure of the gel composition has not been fully elucidated.

The gel compositions are capable of reversibly undergoing transformation from the gel state to a solution, upon heating to a particular temperature, designated as the "dissolution temperature", $T_d$ wherein a color change occurs together with dissolution of the solid polymer in the gel-forming liquid. The dissolution temperature is a function of the particular polydiacetylene, the gel-forming liquid used and the concentration of the polydiacetylene in the gel-forming liquid. For example, poly[4,6-decadiyn-1,10-diol bis(n-butoxycarbonylmethylurethane)], hereinafter referred to as poly 3DBCMU, in o-dichlorobenzene (ODCB) at 0.1 and 0.5 weight percentages, exhibits a dissolution temperature at 102.8°-103.7° C. and 105.0°-105.4° C., respectively. Whereas, poly [5,7-dodecadiyn-1,12-diol bis(n-butoxycarbonylmethylurethane)], hereinafter referred to as poly 4DBCMU, in 0.5 weight percent o-dichlorobenzene, exhibits a dissolution temperature at 65.3°-66.6° C. The color of the transition at the dissolution temperature is also dependent upon the particular polydiacetylene employed. For example, poly 3DBCMU in ODCB exhibits a color change of blue to yellow while poly 4DBCMU in ODCB exhibits a red to yellow color transition.

The formed solution reverts back to the original gel state upon cooling to a temperature below the dissolution temperature, designated as the "gelation temperature", $T_s$, i.e., that temperature at which the gel reforms and the original color of the gel is restored. Thus, the gel exhibits a hysteresis temperature effect in that the formed solution must be cooled to a lower temperature for gel reformation compared to the temperature of gel dissolution, as illustrated in the FIGURE. The remarkable attribute of the present gel compositions is the fact that this hysteresis behavior is reversible throughout many heating and cooling cycles, thus rendering the compositions extremely useful in reversible thermometertype devices.

The gel compositions possess a temperature differential between the dissolution temperature, $T_d$, and gelation temperature, $T_s$, from about 1° to 100° C. and preferred temperature differentials are at least about 10° C.

The gel compositions exhibit dissolution temperatures from about −80° to +200° C. and preferably about −77° C. to +130° C. Particularly of interest are gel compositions exhibiting color transition temperatures at about human body temperature, i.e. 98.2° F., such as a 0.5 weight percent gel of poly 4DBCMU in a 90:10 by volume mixture of methylethyl ketone/dimethylformamide.

Preferred gel compositions are blue or red in color and the resulting solution is yellow in color. These are preferred since the color change from blue or red to yellow presents a dramatic visible color change which is striking and easily observable.

The concentration of polydiacetylene in the gel composition is about 0.001 to 50 weight percent and preferably about 0.1 to 10 weight percent.

Polydiacetylenes which are useful in forming the gel compositions of this invention are generally produced by polymerizing monomeric diacetylenes containing at least one conjugated —C≡C—C≡C— grouping and are listed below.

A preferred class of polydiacetylenes useful in the instant invention for forming the gel compositions, which polydiacetylenes are also novel in themselves, also being a subject of this invention are polydiacetylenes formed by polymerizing diacetylene-diol alkoxycarbonylmethylurethane monomers, also being novel and a subject of this invention, of the formula: R—C≡C—C≡C—R', wherein R and R' are independently selected from the group:

wherein n is an integer value of 1 to 10 and A is $C_1$–$C_{10}$ linear or branched alkyl. The diacetylene monomers used to form the polymers of this invention are symmetrical or unsymmetrical, with respect to n or A, and preferably symmetrical.

Representative examples include the diacetylenes wherein, for convenience the symbols R, R', A and n have independently the meanings shown below in Table I.

TABLE I

| R | | R' | |
|---|---|---|---|
| n | A | n | A |
| 2 | ethyl | 2 | ethyl |
| 2 | n-butyl | 2 | n-butyl |
| 3 | ethyl | 3 | ethyl |
| 3 | n-butyl | 3 | n-butyl |
| 3 | isopropyl | 3 | ethyl |
| 3 | n-decyl | 3 | ethyl |
| 3 | n-octyl | 2 | ethyl |
| 4 | ethyl | 4 | ethyl |
| 4 | n-butyl | 4 | n-butyl |
| 4 | n-decyl | 4 | n-butyl |

Preferred diacetylenes are those wherein R and R' are identical, n is 3 or 4 and A is ethyl or n-butyl. In the list below, these preferred compounds are identified and the chemical names of polydiacetylenes of this invention, obtainable therefrom, are shown below in Table II.

TABLE II

| n | A | Chemical Name |
|---|---|---|
| 3 | ethyl | Poly[4,6-decadiyn-1,10-diol-bis(ethoxycarbonylmethylurethane)], poly 3DECMU |
| 3 | n-butyl | Poly[4,6-decadiyn-1,10-diol bis(n-butoxycarbonylmethylurethane)], poly 3DBCMU |
| 4 | ethyl | Poly[5,7-dodecadiyn-1,12-diol bis(ethoxycarbonylmethylurethane)], poly 4DECMU |
| 4 | n-butyl | Poly[5,7-dodecadiyn-1,12-diol bis(n-butoxy carbonylmethylurethane)], poly 4DBCMU |

As a class, the above polydiacetylene diol alkoxycarbonylmethylurethanes are useful in forming the invention gel compositions of this invention.

Further polydiacetylenes useful in forming the gel compositions of this invention are polydiacetylenes formed from polymerizing diacetylene monomers of the formula R—C≡C—C≡C—R, wherein R is selected from the group consisting of —(CH$_2$)$_n$—O—CONH—B, wherein (a) n is 2 and B is ethyl, n-butyl or m-chlorophenyl;

(b) n is 3 and B is methyl, ethyl, phenyl or m-tolyl;

(c) n is 4 and B is methyl, ethyl, 2-chloroethyl, ochlorophenyl, p-chlorophenyl, n-butyl or m-methoxyphenyl.

In order to obtain the polydiacetylenes useful in forming the gels of the present invention and in particular to obtain these polymers in high yields, it is usually necessary to obtain acetylenic monomers with precursor crystal phases having suitable molecular packing in the solid state. Monomer suitable for making the polymer of the invention can be prepared by known methods as described in U.S. Pat. No. 3,999,946, supra. For example, the bisalkoxycarbonylmethylurethane derivative can be prepared by reacting the corresponding diyn-ol or diyn-diol with a suitable isocyanate. Thus, 5,7-dodecadiyn-1,12-diol bis(n-butoxycarbonylmethylurethane was prepared by reacting 5,7-dodecadiyn-1,12-diol with n-butyl isocyanatoacetate. A catalyst may be added to the reaction mixture to increase the reaction rate to produce the desired acetylenic monomer. Conventional tin catalysts (e.g., dibutyl tin-di-2-ethylhexoate), DBTE, and tertiary amines (e.g. triethyl amine, TEA) have been used as catalysts. The reaction mixture may also be warmed as for example, to about 45° to 55° C. to speed up the reaction. Such heating, however, is not required. The desired diyn-ol or diyn-diol can also be prepared by conventional methods. Thus, for example, 5,7-dodecadiyn-1,12-diol has been prepared by the oxidative coupling of the corresponding alkylol, i.e. 5-hexyn-1-ol.

The desired monomer, is generally recrystallized from an appropriate solvent, so as to provide a solid monomer, preferably in a substantially crystalline phase, which is polymerizable. Suitable solvents employed in the solution recrystallization include alkyl esters of monocarboxylic acids, alkyl alcohols, paraffins, olefins, benzenes, alkylated benzenes, ethers, ketones, petroleum ether, halogenated hydrocarbons and water. Representative examples include ethyl acetate, methyl propionate, methanol, ethanol, butanol, isopropanol, hexane, heptane, 1,4-dimethylheptane, toluene, xylene, trimethylbenzene, ethyl ether, isopropyl ether, 1,2-dimethoxyethane, tetrahydrofuran, dioxane, acetone, ethylmethyl ketone, chloroform, dichloromethane and trichloromethane and mixtures thereof. Especially preferred as crystallizing solvents are 1,2-dimethoxyethane, dioxane, tetrahydrofuran, petroleum ether, acetone, chloroform, benzene, methanol, ethanol, xylene, ethyl acetate, isopropyl ether and water. Crystallization may, for example be affected by room temperature evaporation of solutions containing from 0.01 to 50 parts and preferably about 0.1 to 5 parts by weight of monomer per part of solvent volume. Alternately, other conventional crystallization procedures may be used such as sublimation or by cooling a saturated solution to a sufficiently low temperature (usually at or above room temperature that the required crystallization occurs).

The subject polydiacetylenes disclosed herein are produced by irradiating the corresponding diacetylene diol alkoxycarbonylmethylurethane monomer with at least about 0.1 Mrads of gamma radiation at room temperature or its equivalent at other temperatures and extracting out unpolymerized monomer from the irradiated polydiacetylene.

The term "0.1 Mrads of gamma radiation at room temperature or its equivalent at other temperatures" indicates that the dosage of gamma radiation required for polymerization will vary with the temperature at which the irradiation is conducted. Higher temperatures will in general require lesser amounts of gamma radiation in conversely lower temperatures, i.e. below room temperature will generally require slightly larger amounts of gamma radiation. It is preferred to use a dosage of gamma radiation in the range of about 15 to 100 Mrads, but higher dosages can also be used to insure complete polymerization.

Extraction of the monomer from the irradiated sample can be accomplished by the use of organic solvents including dialkyl ethers, alcohols and ketones. Representative examples are diethylether, diisopropylether (isopropyl ether) methanol, ethanol, acetone and methylethyl ketone wherein acetone and isopropyl ether are preferred.

The infrared spectra of the polydiacetylenes are essentially identical to those of the monomers, indicating that the polymers possess the same functionality as the monomers. Raman spectral evidence indicates that 1,4-addition reaction has occurred at the —C≡C—C≡C— group within the monomer molecule. The Raman intense vibration, at about 2260 cm$^{-1}$ which is characteristic of the conjugated diacetylene functionality of the pure monomer disappears and is replaced by a characteristic Raman intense vibration between 1450 and 1540 cm$^{-1}$ and between 2060 and 2140 cm$^{-1}$ in the polymer. However, if the monomer contains only a fraction of a percent of polymer, the peak at 2260 cm$^{-1}$ becomes obscured in the monomer due to the very strong peak at 2140 cm$^{-1}$ attributable to the polymer. This was the case found for the monomers in Examples 1–4 herein. X-ray diffraction data indicate that the repeat dimension in the chain direction is approximately 4.9 Å or a multiple thereof, with confirmed spectral evidence that the polymerization has proceded by a 1,4-addition reaction.

The term "gel-forming liquids" includes those liquid solvents which act as gel-forming agents for the polydiacetylene below the dissolution temperature, T$_d$, and act as a solvent for the polydiacetylene above this temperature. The gel-forming liquid must be capable of dissolving at least about one tenth of a gram of polydiacetylene in 100 ml of said liquid at the dissolution temperature, and more preferably one gram of polydiacetylene in 100 ml. of gel-forming liquid at the dissolution temperature. The term "gel-forming liquid" is also meant to include mixtures of two or more liquids whose combined properties possess the characteristics described above.

Representative examples of gel-forming liquids useful in forming the gels of the instant invention include linear or branched $C_5$–$C_{10}$ paraffinic hydrocarbons, linear or branched $C_1$–$C_5$ halogenated alkanes, containing 1–4 halogens, $C_2$–$C_4$ linear or branched alkyl sulfoxides, $C_2$–$C_7$ N,N-dialkyl alkanoamides, $C_6$–$C_{10}$ aromatic hydrocarbons, $C_6$–$C_{10}$ halogenated aromatic hydrocarbons containing 1 to 4 halogens, $C_4$–$C_9$ linear or cyclic mono- or diethers, $C_4$–$C_6$ cyclic sulfones, $C_2$–$C_4$ alkanoic acids, $C_3$–$C_6$ linear alkyl ketones, $C_2$–$C_4$ halogenated alkanoic acids, containing 1 to 3 halogens, or mixtures thereof. Aqueous solutions of the above liquids are also included in the present invention.

Specific examples of gel-forming liquids include hexane, methylene dichloride, chloroform, dimethylsulfoxide, tetramethylene sulfone, dimethylformamide, dimethylacetamide, benzene, toluene, xylene, naphthalene, o-dichlorobenzene, trichlorobenzene, diethylether, tetrahydrofuran, dioxane, glyme, acetic acid, propionic acid, trichloroacetic acid, trifluoroacetic acid, water, methylethyl ketone, aqueous solutions thereof, wherein said liquid is water soluble, or mixtures thereof.

Methods of preparation of the gel composition include heating a mixture of solid polydiacetylene and gel-forming liquid therefor until solution is achieved, at the dissolution temperature, and then allowing the solution to cool below the gelation temperature. The heating step is preferably carried out where substantially no evaporation of the gel-forming liquid occurs.

The gel compositions of this invention are useful in devices for reversibly indicating when a predetermined temperature has been reached or exceeded. These thermometer-type devices usually comprise a container, a temperature-indicating material, positioned inside of the container, capable of visually undergoing a color change when a predetermined temperature has been reached or exceeded, and a means for observing said color change. The improved device of this invention contains the subject gel composition as the temperature-indicating material. The gel composition is chosen such that the color transition temperature is in the same range as the predetermined temperature desired to be indicated. When the predetermined temperature is reached, the gel composition forms a solution and undergoes a color change, and this color change persists, allowing the temperature to be observed and recorded, until the temperature is lowered below the dissolution temperature to the gelation temperature thereby restoring the original color and physical state of the gel.

The nature of the container, positioning of the temperature-indicating material inside said container, and means for observing the color change of the temperature-indicator are well known in the art as, exemplified by the above-described patents assigned to Bio-Medical Sciences, Inc., which are hereby incorporated by reference. Further elucidation of the nature of the elements is deemed unnecessary as being obvious to one skilled in the art.

The device is constructed by placing a polydiacetylene gel composition of this invention in a suitable container wherein the polydiacetylene is chosen to have a dissolution temperature in the range to be monitored. For example, if it is desired to monitor abnormally high human body temperature, as is present during a fever, a 0.5 weight percent gel composition of poly 4-DBCMU, in 90–10 percentage by volume of methylethyl ketone/DMF, may be employed. The container can be of any material that is chemically inert to the gel composition, is not soluble therein, and is tightly sealed to prevent evaporation of the gel-forming liquid agent during the temperature-indicating process. Suitable container materials are glass, transparent and solvent-impermeable plastics.

The gel composition in the device is positioned such that the resulting color change is readily observable upon reaching or exceeding the desired predetermined temperature.

Given the polydiacetylene gel composition, disclosed herein, one skilled in the art will readily be able to construct various modifications of temperature-indicating devices and thermometers. Such devices incorporating gel compositions of this invention, as the temperature indicating device, will be obvious to one skilled in the art.

Also a subject of this invention is a partially polymerized colored composition containing up to 10% by weight of a colored polymer derived from polymerizing at least one diacetylene diol alkoxycarbonylmethylurethane monomer as described above.

The polymerization can be conducted by thermal annealing or irradiating the corresponding diacetylene diol alkoxycarbonylmethylurethane monomer, of the formula described above, with ultraviolet radiation or gamma radiation up to a dosage of about 5 Mrads at room temperature or its equivalent at other temperatures. Dosages larger than 5 Mrads are generally required at temperatures below room temperature, and vice versa since the required dosage of gamma radiation will vary in general with the temperature at which the radiation is conducted.

Ultraviolet radiation of short or long wave lengths can be employed to produce the partially polymerized polydiacetylenes and short wave length ultraviolet radiation is preferred. Usually, radiation times of a few second to several hours are sufficient to produce the partially polymerized polyacetylene with a conventional lamp having an intensity of 6250 microwatts at a distance of 15 inches from the source or its equivalent. Thermal annealing can also be employed to produce the partially polymerized polydiacetylene and usually a temperature from about 20° to 80° C. is used and preferably 20° to 30° C. for a period of one day to 6 months is utilized.

The partially polymerized compositions are useful in producing the fully polymerized compositions described herein, and in some cases are useful as "thermochromic" materials in temperature-indicating devices, wherein the term "thermochromic" and the devices are described in U.S. application Ser. No. 839,678, hereby incorporated by reference. For example, partially polymerized [5,7-dodecadiyn-1,12-diol bis(n-butoxycarbonylmethylurethane)] prepared by thermal annealing at room temperature for one month, containing about 1.5 weight percent of polymer, exhibits a thermochromic transition temperature at about 40° C. and changes from a blue to violet in color. Likewise, partially polymerized [5,7-dodecadiyn-1,12-diol bis(ethoxycarbonylmethylurethane)] prepared in the same manner as above, exhibits similar physical properties. Use of the above partially polymerized materials in temperature-indicating or indicia-display devices will be obvious in light of the disclosure of the above-identified U.S. application, hereby incorporated by reference.

A colored composition containing from 10 to 100% by weight of a colored polymer derived by polymerizing at least one diacetylene diol alkoxycarbonylmethylurethane monomer composition, defined hereinabove, is also subject of this invention. These polymeric compositions find use as thermochromic color-indicating solids in temperature-indicating and indicia-display devices described in U.S. application Ser. No. 839,678, hereby incorporated by reference.

As a class, the fully polymeric diacetylene diol alkoxycarbonylmethylurethanes are thermochromic and preparation and use thereof in the above-mentioned devices will be obvious to one skilled in the art from this disclosure and the above-identified reference.

The term "fully polymeric" as used herein refers to those polydiacetylenes which have been monomer-extracted as being preferred embodiments in the applications described herein. However, polydiacetylenes containing from 10 to 100 weight percent polymer, are also useful in the stated applications and can also be used to produce the fully polymeric composition by a monomer-extraction process.

The fully polymeric compositions are also useful in producing shaped articles therefrom such as films and fibers, being also a subject of this invention. For example, poly 4DBCMU can be molded into a film at a processing temperature of about 150° C. The resulting film is thermochromic and can be used in temperature-indicating and indicia-display devices. The processing steps for producing film and fibers from the polymeric composition are conventional and known in the art. In addition, the fully polymerized compositions can be incorporated into other polymers, for example, Halar TM, a chlorotrifluoroethylene copolymer, produced by Alied Chemical Corporation (USA), to produce useful temperature-indicating or indicia-display devices. For example, poly 4DBCMU can be incorporated into Halar film by milling a mixture of the two materials at 500° C., said mixture containing about 5 percent by weight of the polydiacetylene. The resulting light orange-colored film is thermochromic at 110° C. wherein it turns to a red color. The shaped film is useful as a device in temperature-indicating and indicia-display applications, and similarly, fibers containing the subject polydiacetylenes of this invention are also useful in temperature-indicating and indicia-display applications.

The compositions containing 100% by weight fully polymerized material, being monomer-extracted by a suitable solvent such as acetone or isopropyl ether, are useful in the gel compositions of this invention, as described hereinabove.

The following examples are illustrative of the best mode of carrying out the invention as contemplated by us and should not be construed as being limitations on the scope or spirit of the invention.

EXAMPLE 1

Synthesis of 4,6-decadiyn-1,10-diol bis(ethoxycarbonylmethylurethane); 3DECMU

Synthesis:

To a 1000 ml 3-necked flask fitted with a magnetic stirrer, an addition funnel and a thermometer, 16.6 grams (0.1 mole) of 4,6-decadiyn-1,10-diol in 400 ml of tetrahydrofuran was added. 1 g of di-t-butyl-tin-di-2-hexoate and 2 ml of triethylamine were added as catalysts. The resulting solution was stirred and 32.5 g of ethyl isocyanatoacetate,

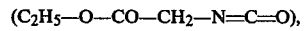

was added dropwise over a period of half an hour. The reaction temperature, 25° C., was kept constant by a cold water bath. The reaction was allowed to proceed for 2 hours and then poured into 3000 ml of hexane. The resulting precipitate was collected by filtration and dried under vacuum. The product weighed 42 grams (yield=98.1%), m.p. 82.6°–83.7° C. Results of elemental analysis and main absorption peaks observed in the infrared spectrum are listed below.

Elemental Analysis: Calculated: C=56.60; H=6.60; N=6.60, O=30.19, Found: C=56.58; H=6.47; N=6.30; O=30.42

Infrared Spectrum: (1) urethane group: 3340 cm$^{-1}$ (NH Stretching), 1690 cm$^{-1}$ (COO) 1550 cm$^{-1}$ (NH,CN), 1300 cm$^{-1}$ (CN,NH); (2) ester group: 1750 cm$^{-1}$ (COO), 1212 cm$^{-1}$ (C—O—C); (3) CH$_2$—O group: 1361 cm$^{-1}$, 1472 cm$^{-1}$ (CH$_2$-O ester)

Solid State Polymerization

The title compound turned blue at room temperature within 24 hrs. indicating thermal solid state polymerizability. Irradiation of the above compound by Co$^{60}$ gamma rays at a dosage of 50 Mrads at room temperature resulted in a metallic (green-gold) polymer. The resulting material was treated with boiling acetone in a Soxhlet extractor for 3 hours to remove unreacted monomer. Obtained were 0.9 g polymer, melting point 195° C., indicating a 90% polymer conversion. Results of the elemental analysis and main absorption bands observed in the infrared spectrum and Raman spectrum are listed below.

Elemental Analysis: Calculated: C=56.03; H=6.60; N=6.60; O=30.18; Found: C=56.04; H=6.62; N=6.42; O=31.81

Infrared Spectrum: (1) urethane group: 3340 cm$^{-1}$ (N—H stretching), 1698 (COO); 1543 cm$^{-1}$ (NH,CN), 1196 cm$^{-1}$ (CN,NH); (2) ester group: 1752 cm$^{-1}$ (COO), 1196 cm$^{-1}$ (C—O—C);

Raman Spectrum: 2078 cm$^{-1}$ (C≡C), 1459 cm$^{-1}$ (C=C)

Thermochromism:

The metallic green-gold polymer produced above changed to a red (orange) color upon heating to 195° C. On cooling the solid to room temperature, it reverted back to its original metallic green-gold color. This thermochromic cycle was repeated many times with no apparent degradation.

The above polydiacetylene, produced by gamma irradiation, was successfully incorporated into Halar TM (made by Allied Chemical Corporation), an ethylene-chlorotrifluoroethylene copolymer, first by milling the two materials at 500° F. and then molding the resulting mass at the same temperature. The Halar film, containing 5.0 percent by weight of the polydiacetylene, was black in color, and turned an orange color upon heating to 196° C. and reverted back to the black color upon cooling to room temperature.

The above polydiacetylene produced by gamma irradiation was molded at 210° C. to yield a film of about 3 mil in thickness. The polydiacetylene film changed from a green-gold to orange color upon heating to 196°

C. The film was reasonably strong being comparable with polyethylene film and was pliable.

EXAMPLE 2

Synthesis of 4,6-decadiyn-1,10-diol bis(n-butoxy carbonylmethyl urethane), 3DBCMU.

Synthesis:

Following the procedure of Example 1, 8.3 grams (0.05 mole) of 4,6-decadiyn-1,10-diol and 19.6 g (0.125 mole) of butyl isocyanatoacetate, ($CH_3$—($CH_2$)$_3$—O—CO—$CH_2$—N=C=O) were reacted in the presence of 0.5 g of di-t-butyl-tin-di-2-ethylhexanoate, 1 ml of triethylamine and 400 ml of tetrahydrofuran. The reaction was allowed to stir for two hours, and was then poured into 3000 ml of hexane. The resulting precipitate was collected by filtration and dried under vacuum. The product weighed 23.5 g, (98.1% yield), m.p. 65.4°–68° C. Results of elemental and main absorption peaks observed in the infrared spectrum are listed below.

Analytical: Elemental Analysis: Calculated: C=60.00; H=7.50; N=5.83; O=26.66; Found: C=59.72; H=7.57; N=5.53; O=26.85

Infrared Spectrum: (1) Urethane group: 3340 $cm^{-1}$ (NH), 1690 $cm^{-1}$ (COO), 1550 $cm^{-1}$ (NH, CN), 1298 $cm^{-1}$ (CN, NH); (2) Ester group: 1740 $cm^{-1}$ (COO), 1212 $cm^{-1}$ (C—O); (3) —$CH_2$—O— group: 1472 $cm^{-1}$ and 1378 $cm^{-1}$ ($CH_2$—O)

Solid State Polymerization:

The above compound turned blue within 24 hrs. at room temperature indicating thermal solid state polymerizability.

The above-prepared compound was crystallized from acetone and hexane. The crystallized diacetylene was irradiated with $Co^{60}$ gamma rays at a dosage of 50 Mrads at room temperature, producing a metallic (green-gold) polydiacetylene polymer. One gram of the unreacted monomer was extracted with acetone in a Soxhlet apparatus yielding 0.53 g polymer, melting point, 183° C. The conversion of monomer to polymer was thus 53%. Results of elemental analysys and main absorption peaks observed in the infrared spectrum and Raman spectrum are listed below.

Elemental Analysis: Calculated: C=60.00; H=7.50; N=5.83; O=26.66; Found: C=59.17; H=7.27; N=5.40; O=29.03

Infrared Spectrum: (1) urethane group: 3340 $cm^{-1}$ (N—H stretching), 1693 $cm^{-1}$ (COO), 1545 $cm^{-1}$ (NH,CN), 1200 $cm^{-1}$ (CN,NH); (2) ester group: 1753 and 1745 $cm^{-1}$ (COO), 1200 $cm^{-1}$ (C—O—C)

Raman Spectrum: 2084 $cm^{-1}$ (C≡C), 1458 $cm^{-1}$ (C=C)

Thermochromism:

The metallic green-gold polymer produced above changed to a red (orange) color upon heating to 185° C. On cooling the solid to room temperature, it reverted back to its original metallic green gold color. This thermochromic cycle was repeated many times without any apparent degradation.

The above polydiacetylene produced by gamma irradiation was molded at 200° C. into a thin green-gold colored (about 3 mil) film. Upon heating to 185° C., the film turned red (orange) in color. On cooling to room temperature, it reverted back to a metallic green gold color. The film was reasonably strong (being comparable to polyethylene) and was pliable.

EXAMPLE 3

Synthesis of 5,7-dodecadiyn-1,12-diol bis(ethoxycarbonyl methyl-urethane), 4DECMU.

Synthesis:

Following the general procedure of Example 1, 9.7 g (0.05 mole) 5,7-dodecadiyn-1,12-diol and 16.0 grams of ethyl isocyanatoacetate, ($C_2H_5$—O—CO—$CH_2$—N=C=O), were reacted in the presence of 0.5 g of di-t-butyl-tin-di-2-ethylhexoate, 1 ml of triethylamine and 200 ml of tetrahydrofuran. The reaction was allowed to proceed for two hours, and was then poured into 2000 ml of hexane. The resulting precipitate was collected by filtration and dried under vacuum. The product weighed 19.8 g (95.6% yield); m.p.=81.5°–82° C. Results of the elemental analysis and main absorption peaks in the infrared spectrum are listed below.

Analytical: Elemental Analysis: Calculated: C=58.33, H=7.19, N=6.03, O=28.27; Found: C=58.40, H=7.08, N=6.19, O=28.3

Infrared Spectrum: (1) Urethane group: 3335 $cm^{-1}$ (NH), 1695 $cm^{-1}$ (COO), 1540 $cm^{-1}$ (NH, CN), 1293 $cm^{-1}$ (CN, NH); (2) Ester group: 1770 $cm^{-1}$ (COO), 1200 $cm^{-1}$ (C—O); (3) —$CH_2$—O— group: 740 $cm^{-1}$, 1460 $cm^{-1}$, 1364 $cm^{-1}$ ($CH_2$—O)

Solid State Polymerization:

The above compound turned blue within 24 hrs at room temperature indicating thermal solid state polymerizability.

The above compound was crystallized from acetone and hexane and the resulting crystallized diacetylene was irradiated with $Co^{60}$ gamma rays at a dosage of 50 Mrads at room temperature. The resulting polydiacetylene was a metallic (green-gold) polymer. The polymer was extracted with isopropyl ether, and yielded polymer, melting point 137° C., in 95% conversion. The results of the elemental analysis and main absorption peaks in the infrared and Raman spectra are listed below.

Elemental Analysis: Calculated: C=58.33; H=7.19; N=6.03; O=28.27; Found: C=57.37; H=7.45; N=6.26; O=29.64

Infrared Spectrum: (1) urethane group: 3340 $cm^{-1}$ (N—H stretching), 1723 $cm^{-1}$ and 1698 $cm^{-1}$ (COO), 1545 $cm^{-1}$ (NH,CN), 1200 $cm^{-1}$ (CN,NH); (2) ester group: 1753 (COO), 1200 $cm^{-1}$ (C—O—C)

Raman Spectrum: 2092 $cm^{-1}$ (C≡C), 1465 $cm^{-1}$ (C=C)

Thermochromism:

The above-prepared metallic green-gold polymer turned a red (orange) color upon heating to 135° C. On cooling the solid to room temperature, the solid reverted to its metallic color.

The above-prepared polydiacetylene was molded into film (about 3 ml thick) at 150° C. The film was pliable and a dark red color. Upon heating, the film turned light pink at 135° C. and upon cooling it reverted to a dark red color.

The above polydiacetylene was incorporated into Halar by milling the two materials at 500° F. and then molding the resulting mass at the same temperature. The resulting Halar film (containing 5% by weight of the polydiacetylene) was red in color. The film turned orange upon heating to 135° C. and reverted back to its original red color upon cooling to room temperature.

EXAMPLE 4

Synthesis of 5,7-dodecadiyn-1,12-diol bis(n-butoxycarbonylmethylurethane), 4DBCMU Synthesis:

Following the general procedure of Example 1, 9.7 g (0.05 mole) of 5,7-dodecadiyn-1,12-diol and 19.6 g (0.125 mole) of butyl isocyanatoacetate, $CH_3(CH_2)_3-O-CO-CH_2-N=C=O$, were reacted in the presence of 0.5 g of di-t-butyl-tin-di-2-ethylhexoate, 1 ml of triethylamine and 200 ml of tetrahydrofuran. The reaction was allowed to proceed for 2 hours and then the mixture was poured into 2000 ml of hexane. The resulting precipitate was collected by filtration and dried under vacuum. The product weighed 23.0 g (yield 90.5%) m.p.=73.5° to 74.5° C. Results of the elemental analysis and main absorption peaks in the infrared spectrum are listed below.

Analytical: Elemental Analysis: Calculated: C=61.40, H=7.87, N=5.51, O=25.19; Found: C=61.47, H=8.03, N=5.36, O=25.13

Infrared Spectrum: (1) Urethane group: 3335 cm$^{-1}$ (NH), 1696 cm$^{-1}$ (COO) 1545 cm$^{-1}$ (NH, CN), 1292 cm$^{-1}$ (CN, NH); (2) Ester group: 1768 cm (COO), 1203 cm (C—O); (3) —CH$_2$—O—: 740 cm$^{-1}$, 1460 cm$^{-1}$, 1370 cm$^{-1}$ (CH$_2$—O)

Solid State Polymerization:

The above compound turned blue within 24 hrs. at room temperature indicating thermal solid state polymerizability.

The above compound was crystallized from acetone/hexane and then irradiated with Co$^{60}$ gamma rays at a dosage of 50 Mrads at room temperature. The resulting polydiacetylene was a metallic green-gold polymer. Unreacted monomer was extracted with isopropyl ether, yielding a polymer having a melting point of 136° C. The conversion of monomer into polymer was 92.7%. The results of the elemental analysis and main absorption peaks in the infrared spectrum and Raman spectrum are listed below.

Elemental Analysis: Calculated: C=61.40; H=7.87; N=5.51; O=25.19; Found: C=55.68; H=7.29; N=4.80; O=27.21

Infrared Spectrum: (1) urethane group: 3340 cm$^{-1}$ (N—H stretching), 1723 cm$^{-1}$ and 1693 cm$^{-1}$ (COO), 1545 cm$^{-1}$ (NH,CN), 1200 cm$^{-1}$ (CN,NH) (2) ester group: 1750 (COO), 1200 cm$^{-1}$ (C—O—C)

Raman Spectrum: 2087 cm$^{-1}$ (C≡C), 1461 cm$^{-1}$ (C=C)

Thermochromism:

It was found that partially polymerized 5,7-dodecadiyn-1,12-diol bis(n-butoxycarbonylmethylurethane) produced by solid state polymerization at room temperature, was also thermochromic. The solid turned blue when stored at room temperature for one day, which was evidence of solid state polymerizability. This solid retained its blue color in the temperature range from −180° C. to room temperature. Upon gradual heating from room temperature to 73° C., (the melting point of the polimer) the partially polymerized diacetylene gradually turned violet, at about 40° C.

The fully polymerized polymer, prepared above by gamma irradiation, followed by monomer extraction, underwent a metallic green-gold to red color transition at 110° C. and a red to yellow color transition at 137° C. On cooling to room temperature, the solid reverted to dark red color having a green-gold tint.

The irradiated and extracted polydiacetylene was molded into film (about 3 mil thick) at 150° C. The resulting film was pliable and dark red in color and upon heating at 110° C., the film turned light pink in color. Subsequent cooling produced a dark red color.

The irradiated and extracted polydiacetylene was incorporated into Halar first by milling the two materials at 500° F. and then molding the resulting mass at the same temperature. The resulting Halar film (containing 5% by weight of the polydiacetylene) was red in color. The film turned light orange in color at 110° C. and reverted to a red color on cooling to room temperature.

Coating of the Polydiacetylene:

The above polydiacetylene was found to be highly soluble in organic polar solvents such as acetone, tetrahydrofuran and chloroform. For example, the polydiacetylene was dissolved in acetone (1 g, in 100 ml). Thin coatings of the polydiacetylene were obtained by dipping a clean glass slide into the above-prepared solution and also by spreading the solution on a polyethylene film and allowing the solvent to evaporate. A very thin red-colored coating of the polydiacetylene was obtained. The coating turned orange at 115° C. and yellow at 135° C.

General Procedure (A) for Preparation of a Polydiacetylene Gel

A polydiacetylene, in a quantity of 0.1250 grams, was placed into a 50 ml flask. To the flask was added 25.0 ml of a gel-forming liquid. The contents were stirred overnight. In the case where the gel-forming liquid was also a solvent for the polydiacetylene at room temperature, a gel formed upon stirring below room temperature. In the case where the polydiacetylene was only sparingly soluble in the gel-forming liquid, a gel did not form until the mixture was subsequently heated to the color transition temperature.

General Procedure (B) For Device Preparation

The thin capillary end of a 9" long disposable pipette was sealed with an oxygen/gas torch. The capillary portion of the pipette served as the container for the device. Three tenths ml. of the formed gel or resulting mixture of polydiacetylene and gel-forming liquid was introduced into the wide end of the pipette, which was shaken to allow the contents to settle, into the capillary portion of the pipette. The wide end was then closed by means of sealing as above, or with a cork.

General Procedure (C) for Measuring the Dissolution Temperature ($T_d$) of the Gel Composition The dissolution temperature, designated as $T_d$, was measured by means of a paraffin oil bath comprised of five hundred ml of paraffin oil in a 600 ml beaker. The bath was heated and stirred by means of a hot plate/stirrer. The sealed pipette, prepared above in Procedure B, was placed into the bath together with a calibrated mercury thermometer in a side-by-side fashion, both being tightly clamped. The temperature of the bath was increased until a color transition occurred. The color transition temperature was recorded and the bath was allowed to cool until a temperature at which the original color of the gel was regenerated, designated $T_s$, the gelation temperature, which was also recorded.

EXAMPLE 5

Following the General Procedures of A, B and C, described above, 0.5 wt. percent gel compositions of poly 3DBCMU and poly 4DBCMU were prepared and tested. Poly 3DBCMU and poly 4DBCMU were prepared by polymerizing the corresponding diacetylene diol alkoxycarbonylmethylurethane monomer by gamma-radiation and extracting out residual monomer from the polymer with acetone in the case of poly 3DBCMU and isopropyl ether in the case of poly 4DBCMU. The results, illustrating the effect of polymer composition on the dissolution temperature, gelation temperature, and the observed color transitions, are listed below in Table I.

TABLE I

Effect of Polymer Composition

System:
Polydiacetylene - Varied (see table below for chemical names)
Gel Forming Liquid - o-Dichlorobenzene
Concentration - 0.5% (wt.)

| Polydiace-tylene | Color Transition | Transition Temperature (°C.) Range | |
|---|---|---|---|
| | | $T_d$ Heating | $T_s$ Cooling |
| Poly 3DBCMU | blue–yellow | 105.0–105.4 | 91.5–90.6 |
| Poly 4DBCMU | red–yellow | 65.3–66.6 | 43.2–42.8 |

As is seen, for a gel comprised of poly 3DBCMU in o-dichlorobenzene, a blue–yellow color occurs when heating the gel to a temperature of 105.0°–105.4° C., and the resulting yellow color persists until the temperature is lowered to 90.6°–91.5° C., the gelation temperature, whereupon the gel is regenerated.

EXAMPLE 6

Following the General Procedures of A, B and C, described above, gel compositions containing various weight percentages of poly 3DBCMU were prepared and tested to determine the effect of concentration on the observed transition properties. Poly 3DBCMU was prepared by the same procedure as Example 2. Results are tabulated below in Table II.

TABLE II

Effect of Polydiacetylene Concentration

System:
Polydiacetylene     Poly 3DBCMU
Gel-Forming Liquid  o-Dichlorobenzene
Concentration       Varied (See Table below)
Color Transition    Blue–yellow

| Polydiacetylene Concentration (% weight of gel) | Transition Temperature (°C.) Ranges | |
|---|---|---|
| | $T_d$ Heating | $T_s$ Cooling |
| 0.1 | 102.8–103.3 | 88.2–84.4 |
| 0.5 | 105.0–105.4 | 91.5–90.6 |
| 1.0 | 105.2–105.6 | 91.2–90.5 |

EXAMPLE 7

Following the General Procedures of A, B and C, 6.5 weight percent gel compositions of poly 4DBCMU, prepared as in Example 4, in various gel-forming liquids, were prepared and tested to determine the effect on gel properties. The results are listed below in Table III.

TABLE III

Effect of Different Gel-Forming Liquids

System:
Polydiacetylene     Poly 4DBCMU
Gel-Forming Liquids Varied (See Table below)
Concentration       0.5% (wt.)
Color Transition    red–yellow

| Gel-Forming Liquid | Transition Temperature (°C.) Ranges | |
|---|---|---|
| | Heating $T_d$ | Cooling $T_s$ |
| Ethyl acetate | 58.0–59.0 | 34.5 |
| Methyl ethyl ketone | 49.0–49.5 | 19.0 |
| o-Dichlorobenzene | 65.3–66.6 | 43.2–42.8 |

EXAMPLE 8

Following the General Procedures of A, B and C, gel compositions containing 0.5 weight percent poly 3DBCMU, prepared as in Example 5, in a liquid mixture of two gel-forming liquids were prepared and tested to determine the effect on gel transition properties. The results are tabulated below in Table IV.

TABLE IV

Variation in the Dissolution Temperature By Use of Two Gel-Forming Liquids

System:
Polydiacetylene     Poly 3DBCMU
Gel-Forming Liquids Mixture of two solvents (See Table Below)
Concentration       0.5% (wt.)
Color Transition    blue–yellow

| Gel-Forming Liquids | | Transition Temperature (°C.) Ranges | |
|---|---|---|---|
| o-Dichloro-benzene (% Vol) | Dimethyl-Formamide (% Vol) | Heating $T_d$ | Cooling $T_s$ |
| 100 | — | 105.0–105.4 | 91.5–90.6 |
| 75 | 25 | 70.4–70.9 | 29–28.7 |

EXAMPLE 9

The procedure described in Example 8 was repeated except that methylethyl ketone replaced o-dichlorobenzene as a gel-forming liquid. The results are tabulated below in Table V.

TABLE V

Variation in the Dissolution Temperature By Use of Two Gel-Forming Liquids

System:
Polydiacetylene     Poly 4DBCMU
Gel-Forming Liquids Mixture of two solvents (See Table below)
Concentration       0.5% (wt.)
Color Transition    Red–yellow

| Gel-Forming Liquids | | Transition Temperature | |
|---|---|---|---|
| Methyl Ethyl Ketone (% Vol) | Dimethyl-Formamide (% Vol) | Heating $T_d$ | Cooling $T_s$ |
| 100 | — | 49.0–49.5 | 19.0 |
| *90 | 10 | 36.5–38.0 | 0 |

*This composition is particularly suitable for detecting abnormally high body temperatures.

The above-described gel compositions are useful in devices for monitoring and indicating predetermined temperatures wherein a physical state transition occurs at the predetermined temperature, resulting in a color change, said color change persisting until the temperature is subsequently decreased below the predetermined temperature. The device containing the gel composition is thus regenerated and ready for reuse.

We claim:

1. A composition consisting essentially of (A) at least one polydiacetylene selected from the group consisting of 1,4 addition polymers of conjugated diacetylene monomers having the formula R—C≡C—C≡C—R¹ wherein R and R¹ are urethane groups independently selected from (I):—$(CH_2)_n$—O—CONH—$CH_2$—COOA, where n is an integer of 1–10 and A is $C_1$–$C_{10}$ linear or branched alkyl; and polymers of diacetylene monomers having said formula R—C≡C—C≡C—R¹ wherein R and R¹ are identical urethane groups selected from:

(II):—$(CH_2)_n$—O—CONHB wherein (a) n is 2 and B is ethyl, n-butyl or m-chlorophenyl; or (b) n is 3 and B is methyl, ethyl, phenyl or m-tolyl; or (c) n is 4 and B is methyl, ethyl, 2-chloroethyl, o-chlorophenyl, p-chlorophenyl, n-butyl or m-methoxyphenyl;

said composition also consisting essentially of (B) a liquid capable of forming a gel with said polydiacetylene and of forming a solution of said polydiacetylene upon elevation of the temperature of the gel to at least the dissolution temperature, said gel containing about 0.001 to 50 weight percent of said polydiacetylene, and said solution having a different color from that of said gel and being capable of reversibly reforming the gel in its original color upon cooling to the gelation temperature; said liquid being at least one member of the group consisting of linear or branched $C_5$–$C_{10}$ paraffinic hydrocarbons, linear or branched $C_1$–$C_5$ halogenated alkanes containing 1–4 halogen atoms, $C_2$–$C_4$ linear or cyclic alkyl sulfoxides, $C_4$–$C_6$ cyclic sulfones, $C_2$–$C_7$ N,N-dialkylalkanoamides, $C_6$–$C_{10}$ aromatic hydrocarbons, $C_6$–$C_{10}$ halogenated aromatic hydrocarbons containing 1 to 4 halogen atoms, $C_4$–$C_6$ linear or cyclic mono-or diethers, $C_2$–$C_4$ alkanoic acid and ethyl esters therof, $C_3$–$C_6$ linear alkyl ketones and $C_2$–$C_4$ halogenated alkanoic acids containing 1 to 3 halogen atoms.

2. The composition of claim 1 wherein the gelation temperature is at least about 10° C. lower than the dissolution temperature.

3. The composition of claim 1 wherein said dissolution temperature is about minus 77° C. to plus 130° C.

4. The composition of claim 1 wherein said polydiacetylene is present in about 0.1 to 50 weight percent of the gel.

5. The composition of claim 1 wherein said polydiacetylene is a polymer of a diacetylene monomer of the formula: R—C≡C—C≡C—R', wherein R and R' are independently selected from the formula:

—$(CH_2)_n$—O—CONH—$CH_2$—CO—OA wherein n is an integer value of 1–10 and A is $C_1$–$C_{10}$ linear or branched alkyl.

6. The composition of claim 5 wherein R and R' are identical, n is 3 or 4, and A is ethyl or n-butyl.

7. The composition of claim 1 wherein said polydiacetylene is a polymer of a diacetylene monomer of the formula: R—C≡C—C≡C—R, wherein R is selected from the group consisting of the formula:

—$(CH_2)_n$—O—CONH—B, wherein (a) n is 2 and B is ethyl, n-butyl, m-chlorophenyl; (b) n is 3 and B is methyl, ethyl, phenyl or m-tolyl; or (c) n is 4 and B is methyl, ethyl, 2-chloroethyl, o-chlorophenyl, p-chlorophenyl, m-tolyl or m-methoxyphenyl.

8. The composition of claim 1 wherein said gel-forming liquid is capable of dissolving at least about one-tenth of a gram of said polydiacetylene in one hundred ml. of said liquid at the dissolution temperature.

9. The composition of claim 1 wherein said liquid is hexane, methylene chloride, chloroform, dimethyl sulfoxide, tetramethylene sulfone, dimethylformamide, dimethylacetamide, benzene, toluene, xylene, naphthalene, o-dichlorobenzene, trichlorobenzene, diethyl ether, tetrahydrofuran, dioxane, glyme, acetic acid, ethyl acetate propionic acid, trichloroacetic acid, trifluoroacetic acid, acetone, methylethyl ketone, or mixtures thereof.

10. The composition of claim 1 wherein said polydiacetylene is poly [4,6-decadiyn-1,10-diol bis(n-butoxy carbonylmethylurethane)] and the gel-forming liquid is xylene, o-dichlorobenzene, or acetic acid.

11. The composition of claim 1 wherein said polydiacetylene is poly [5,7-dodecadiyn-1,12-diol bis(n-butoxycarbonylmethylurethane)] and the gel-forming liquid is xylene, o-dichlorobenzene or methylethyl ketone.

12. In a device for reversibly indicating when a predetermined temperature has been reached or exceeded including a container, a temperature-indicating material, positioned inside of said container, capable of reversibly undergoing a color change when a predetermined temperature has been reached or exceeded, and a means for observing said color change; the improvement which comprises providing a polymeric gel of claim 1 as the temperature-indicating material wherein the color change, formed at the predetermined temperature, persists until a temperature lower than the predetermined temperature is reached thereby restoring the original color and physical state of the gel.

* * * * *